United States Patent [19]

Rhee

[11] Patent Number: 4,757,238

[45] Date of Patent: Jul. 12, 1988

[54] LOW VOLTAGE FLUORESCENT LIGHTING SYSTEM

[75] Inventor: Shin W. Rhee, Northridge, Calif.

[73] Assignee: Thin-Lite Corporation, Camarillo, Calif.

[21] Appl. No.: 927,738

[22] Filed: Nov. 5, 1986

[51] Int. Cl.[4] ........................ H02H 3/24; H05D 37/02

[52] U.S. Cl. .................................... 315/240; 315/228; 315/241 R; 315/DIG. 4; 315/33; 315/232; 315/310; 315/324

[58] Field of Search .................... 315/96, 97, 101, 105, 315/221, DIG. 7, 240, 227 R, 33, 313, 320, 324, 241 R, 232, 228, 362

[56] References Cited

U.S. PATENT DOCUMENTS

| | | | |
|---|---|---|---|
| 3,869,640 | 3/1975 | Kolomysec | 315/97 |
| 3,953,768 | 4/1976 | Meredith et al. | 315/DIG. 7 X |
| 4,150,323 | 4/1979 | Yeh et al. | 315/DIG. 7 X |

*Primary Examiner*—David K. Moore
*Assistant Examiner*—Mark R. Powell
*Attorney, Agent, or Firm*—Fulwider, Patton, Rieber, Lee & Utecht

[57] ABSTRACT

This invention is directed to an improved low voltage fluorescent lighting system having two elongated fluorescent lamps. The invention provides an improved simple switching system which allows one or both lamps to be turned on. The improved switching system includes a high capacitance by-pass circuit parallel to one of the fluorescent lamps which, when closed, by-passes sufficient current so that the lamp in parallel will not be lit.

9 Claims, 2 Drawing Sheets

LOW VOLTAGE FLUORESCENT LIGHTING SYSTEM

BACKGROUND TO THE INVENTION

This invention generally relates to fluorescent lighting systems and particularly to fluorescent lighting systems having low voltage DC power sources such as are found in motor vehicles.

A wide variety of circuits for low voltage fluorescent lighting systems (e.g., 12 volts) have been heretofore used or described in the literature or patents. See, for example, U.S. Pat. No. 4,319,164 (Tulleners), U.S. Pat. No. 4,145,636 (Doli) and U.S. Pat. No. 3,749,977 (Silker). These circuits are designed to convert the current from a low voltage DC power source to an alternating or pulsating current and they include one or more power transistors and transformers. The primary windings of the transformers are usually electrically coupled to the collector of a power transistor and one secondary winding is provided for feedback from the emitter of the power transistor to the base thereof to activate the power transistor. Another secondary winding is provided to generate a high voltage alternating or pulsating current to light the fluorescent lamps. The transformer may also be provided with other secondary windings which are used for preheating one or more of the filaments of the lamp to provide a rapid start thereof.

With the prior art devices, if two fluorescent lamps were to be powered by the same DC source, additional secondary windings would be necessary and no means would be provided to operate the fluorescent lamps independently without complex switching arrangements.

What has been needed and heretofore unavailable is a simple system for the operation of a pair of fluorescent lamps which are powered from the same low voltage DC source but which can be operated together or one of the lamps can be operated independently.

SUMMARY OF THE INVENTION

This invention is directed to an improved low voltage lighting system having at least a pair of fluorescent lamps therein and particularly to such a lighting system having switching means to operate both lamps simultaneously or one of the lamps independently.

The fluorescent lighting system in accordance with the invention generally comprises a first and second pair of sockets, each pair of which are adapted to receive opposing ends of a pair of elogated fluorescent lamps, a power conversion system to convert direct current from a DC source to an alternating or pulsating current which has sufficient power to cause the illumination of both fluorescent lamps, a parallel circuit to carry alternating or pulsating current from the power conversion system to the first pair of sockets, a high resistance circuit to connect the second pair of sockets in series with the DC power source, and a by-pass circuit in parallel with one of the fluorescent lamps having a considerably greater capacitance than the fluorescent lamp and a switch therein so that when the switch is closed, sufficient current is by-passed through the parallel circuit to prevent the illumination of the fluorescent lamp in parallel therewith.

The power conversion system of the lighting system includes a transformer having a first primary winding connected at one end to the DC power source and at the other end to the collector of a power transistor and a high voltage secondary winding connected at both ends to the parallel circuit for directing the operating alternating or pulsating current to the fluorescent lamps. Preferably, a pair of low voltage secondary windings are provided in the transformer for generating a low voltage alternating or pulsating current to the filaments of the fluroescent lamps to facilitate the rapid start thereof. Both ends of each heater coil are connected in parallel to one of the first pair of sockets.

The controlling unit of the power conversion system comprises a power transistor with the collector thereof coupled in series to the discharge end of the primary winding. The emitter of the power transistor is connected in series to the second pair of sockets by a line, preferably having both capacitance and inductance elements in the circuit. A feedback line from the transistor emitter to the base thereof is also provided.

In accordance with the details of the present invention, the high capacitance circuit parallel with both of the sockets for one of the fluorescent lamps is provided with a switch therein to open and close the circuit. The switch is preferably an integral part of a double-pole, triple-position switch, one pole of which is coupled at one end to the DC power source and the other end to the primary winding so as to activate both fluorescent lamps simultaneously, and one pole of which opens and closes the high capacitance circuit to operate the fluorescent lamp in parallel therewith.

In one position, the first pole couples the DC power source with the power conversion system and the second pole is disconnected to open the high capacitance circuit to thereby light both lamps. In a second position, the first pole again couples the DC power source with the power conversion system but the second pole closes the high capacitance circuit parallel to one of the lamps to thereby by-pass sufficient current to prevent the one fluorescent lamp from being lit. In the third position, the poles open both circuits so that no current flows through the system and so as to prevent both lamps from being lit.

The fluorescent lighting systems in accordance with the invention allows for one or both lamps to be operated yet it eliminates the need for bulky or multiple transformers and complex switching arrangements. Moreover, there is little change in the power to the individual lamps when the switch is positioned to activate one or both of the fluorescent lamps.

These and other advantages of the invention will become more apparent from the following detailed description thereof taken in conjunction with the accompanying exemplary drawings.

DETAILED DESCRIPTION OF THE INVENTION

Figure 1:
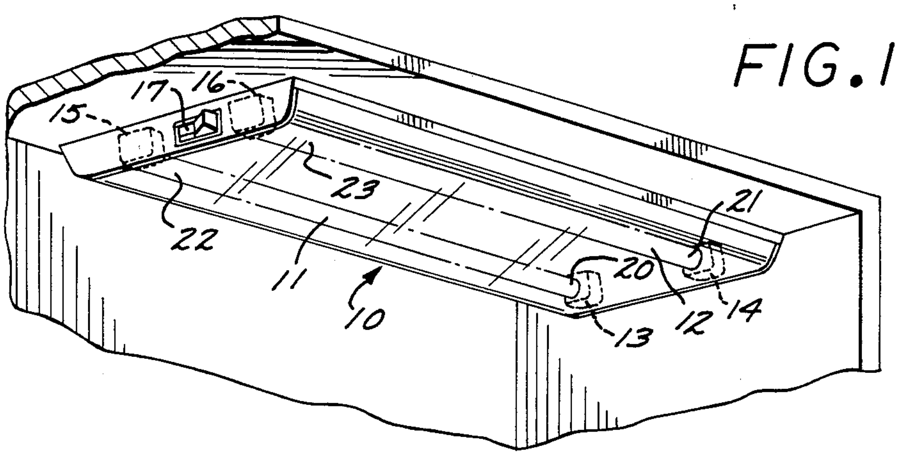
FIG. 1 is a perspective view of a fluorescent lamp assembly embodying features of the invention.
Figure 2:
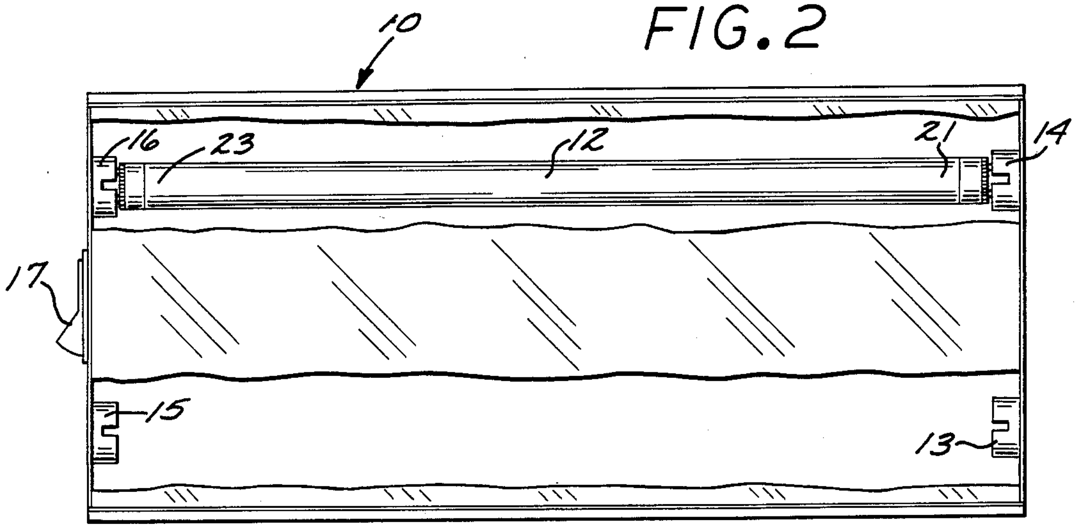
FIG. 2 is a bottom view of the lamp assembly shown in FIG. 1.

With reference to FIGS. 1 and 2 a fluorescent lighting system 10 is shown which generally comprises a pair of fluorescent lamps 11 and 12, a first pair of sockets 13 and 14, a second pair of sockets 15 and 16, and a three-position, double-pole switch 17 which activates the lighting system. Socket 13 is adapted to receive the end 20 of fluorescent lamps 11 and socket 14 is adapted to receive the end 21 of the fluroescent lamp 12. Sockets 15 and 16 are adapted to receive the matched ends 22 and 23 of the fluorescent lamps 11 and 12, respectively. When the switch 17 is moved to a first position, both fluorescent lamps 11 and 12 are turned on, when moved to a second position, lamp 11 is turned off but lamp 12 remains on, and when moved to a third position, both fluorescent lamps 11 and 12 are turned off.

Figure 3:
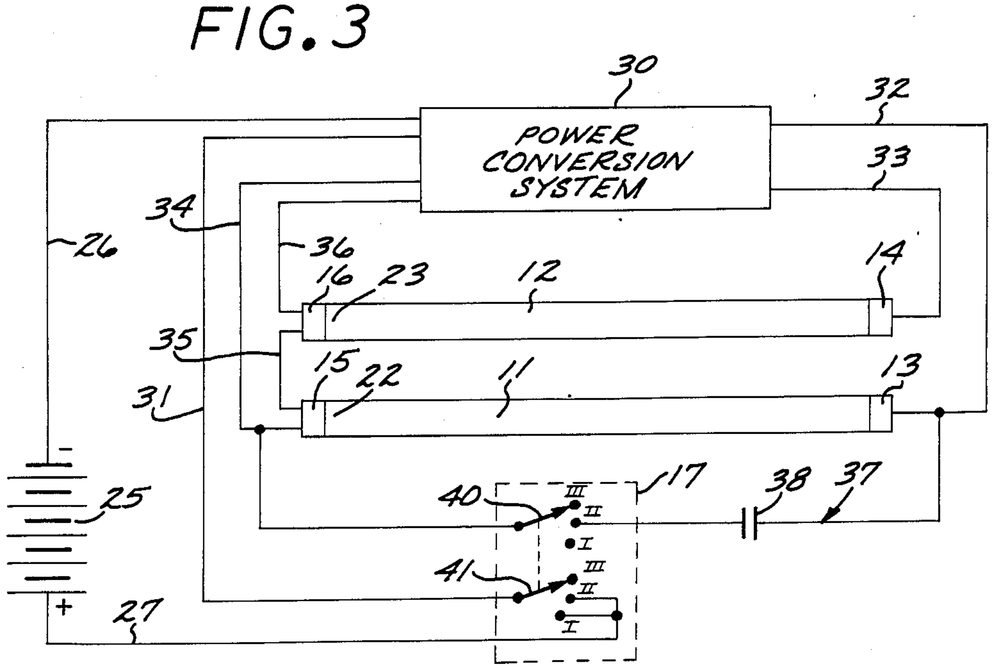
FIG. 3 is a simplified schematic view of an electrical circuit embodying features of the invention.

FIG. 3 represents a schematic illustration of a basic circuit embodying features of the invention. Generally, there is a low voltage DC power source 25 having positive and negative terminals as indicated and conductors 26 and 27 leading therefrom. Conductor 27, attached to the positive terminal of DC power source 25 is coupled to switch 17, preferably a double-pole triple-position switch as indicated. Switch 17 interconnects the DC power source 25 with the power conversion system 30 through conductor 31. The power conversion system 30 converts the DC current to a high voltage alternating or pulsting current which is directed through conductors 32 and 33 to the first pair of sockets 13 and 14 which receive the matched ends 20 and 21 of the fluorescent lamps 11 and 12. The second pair of sockets 15 and 16, adapted to receive the opposing matched ends 22 and 23 of the fluorescent lamps 11 and 12 are connected in series by means of conductors 34, 35, and 36 to the power conversion system 30. By-pass circuit 37, provided with capacitor 38 is coupled to both sockets 13 and 15 which receive lamp 11.

The double-pole, three-position switch 17 is provided with one pole 40 which is integral with the by-pass circuit 37 in parallel with fluorescent lamp 11 and with a second pole 41 which is coupled to conductors 27–31 directing direct current from the DC source to the power conversion system 30.

When the switch 17 is in position I, a high voltage alternating or pulsating current passes from the power conversion system 30 through conduits 32 and 33 to the pair of sockets 13 and 14 so as to light both fluorescent lamps 11 and 12. When the switch 17 is moved to position II, the high voltage alternating or pulsating current continues to pass through conductors 32 and 33, but parallel circuit 37 is closed, thereby by-passing a sufficient amount of the high voltage current from conductor 32 so that there is insufficient current to activate the fluorescent lamp 11. Fluorescent lamp 12, however, remains lit. When switch 17 is moved to position III, both poles 40 and 41 are unconnected from their respective circuits so as to exclude passage of current from the DC source 25 to the power conversion system 30 so that both lamps 11 and 12 are turned off. The capacitance of capacitor 38 in parallel circuit 37 is selected to ensure that sufficient alternating or pulsating current by-passes the fluorescent lamp 11 which has considerably less capacitance, to prevent it from being lit.

Figure 4:
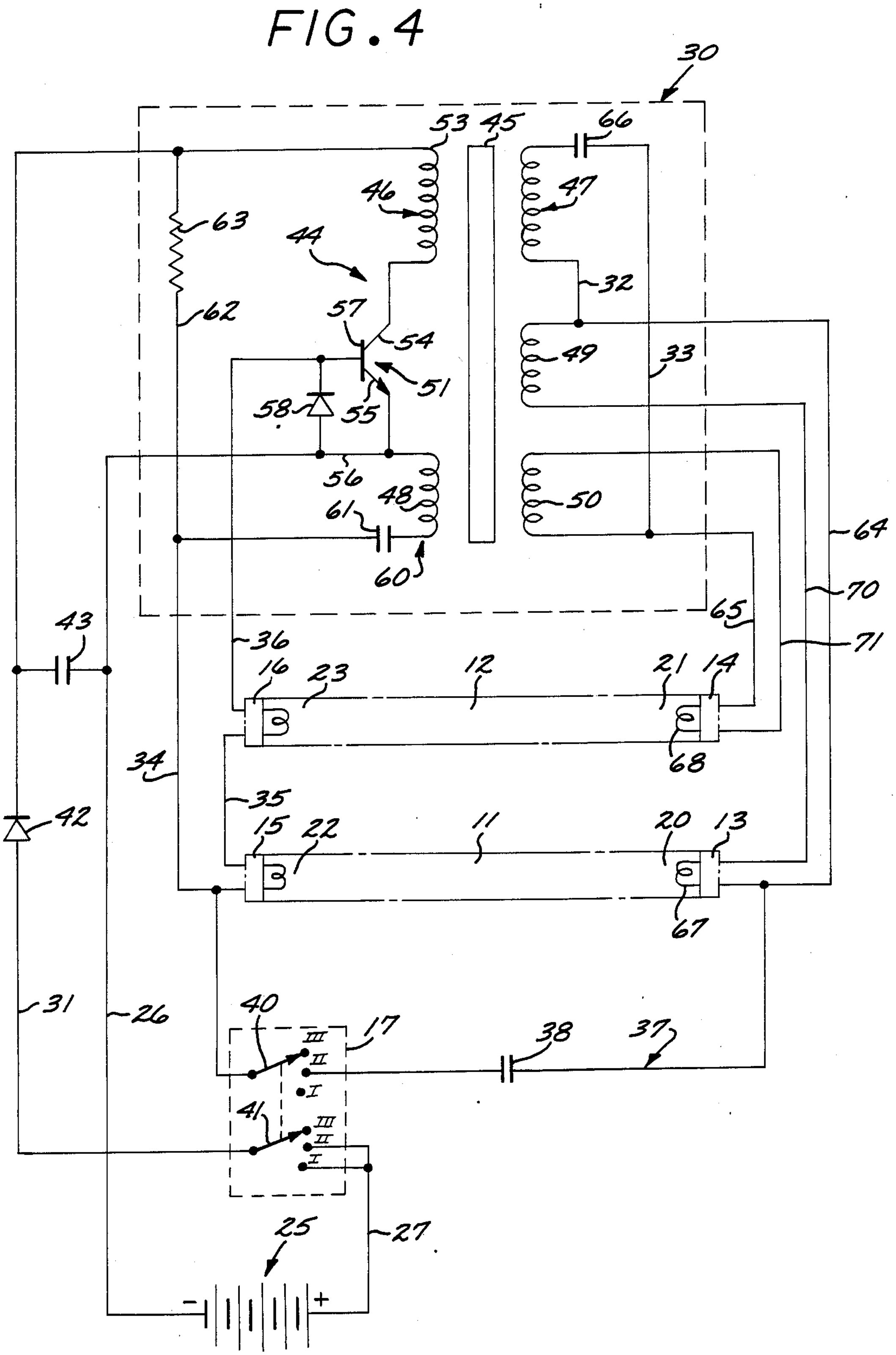
FIG. 4 is a schematic view which more completely shows the details of an electrical circuit for the lighting system shown in FIG. 3.

FIG. 4 shows in more detail a preferred electrical circuit for the lighting system of the invention. The DC power source 25 (e.g., 12 volts) and the switch 17 are essentially as shown in FIG. 3. Conductor 31 leading from switch 17 to power conversion system 30 is provided with a diode 42 (e.g., type MR 500) to ensure current flow in the one direction shown and is interconnected to conductor 26 through a capacitor 43 (e.g., 220 μF) to minimize large current surges which might damage the power conversion system 30.

The power conversion system 30 generally comprises a transformer 44 having a core 45, a first primary winding 46, a high voltage secondary winding 47, a second primary winding 48, and a pair of low voltage secondary windings 49 and 50. A power transistor 51 (e.g., an n-p-n transistor such as type 2N3055) is used for controlling the power conversion system 30. Conductor 31 leads from the switch 17 to the inlet end 52 of the first primary winding 46 with the discharge end 53 thereof coupled to the collector 54 of transistor 51. The emitter 55 is coupled to feedback loop 56 to base 57 of the transistor 51. The feedback loop 56 includes a diode 58 (e.g., type 1N4501). The emitter 55 is also connected in series to an LC circuit 60 which comprises the second primary winding 48 of the transformer 44 and a capacitor 61 (e.g., 0.47 μF). The LC circuit 60 is connected in series to the sockets 15 and 16 through conductor 34 and ultimately to the base 57 of the transistor 51. A high resistance line 62 leading from the power conductor 31 is provided with a resistance 63 and is connected in series with the socket 15 of lamp 11.

The high voltage secondary coil 47 is connected in parallel to the sockets 13 and 14 by conductors 32 and 64 and 33 and 65, respectively. Preferably, one of the conductors 32 or 33 is provided with a capacitor 66 (e.g., 0.022 μF). Low voltage secondary coils 49 and 50 are provided to heat filaments 67 and 68. Secondary winding 49 is coupled to socket 13 through conductors 64 and 70 and secondary winding 50 is coupled to socket 14 through conductors 65 and 71.

Lamp operation begins when the switch 17 is moved to position I which causes direct current from the DC power source 25 to pass through the conductor 31 and diode 42 to the inlet end 53 of primary winding 46. A small current is lead from conductor 31 through resistor 63 which ultimately leads to the base 57 of the transistor 51. This small current initially causes the transistor 51 to draw current through the primary winding 46 through the collector 54 thereof. The transistor 51 draws current until the transformer core 45 of lamps 11 and 12 are saturated, at which point, current flow through the transistor 51 terminates, thereby causing the transformer field to collapse. The resultant discharge of the fluorescent lamps 11 and 12 through ends 22 and 23 is fed to the base 57 of the transistor 51 through conductors 35 and 36, thereby reactuating the transistor 51 to again draw current through the primary winding 46. The transistor draws current through the primary winding at very high frequencies, such as up to about 15 to 25 kHz, preferably about 20 kHz.

The varying current passing through the primary winding 46 induces an alternating or pulsating current in the high voltage secondary winding 47 to activate the filaments 67 and 68 to thereby light the fluorescent lamps 11 and 12. The current induced in the low voltage secondary windings 49 and 50 maintain the filaments 67 and 68 at elevated temperatures to ensure a rapid start of lamps 11 and 12.

When the switch 17 is moved to position II, the high voltage current continues to pass through conductor 68 of socket 14 so that lamp 12 remains lit. However, in position II, the pole piece 40 closes the high capacitance circuit 37 parallel with fluorescent lamp 11 to turn off the lamp. As previously mentioned, the capacitor 38 in the parallel circuit 37 should provide sufficient capacitance thereto to by-pass enough current through the parallel circuit to prevent the lamp 11 from being lit. In position II, the low voltage from secondary winding 49 continues to pass sufficient current through conductors 64 and 70 to filaments 67 to maintain the latter at the elevated temperatures needed for the rapid starting of lamp 11.

In position III, the switch 17 opens the circuit between the power source 25 an the power conversion system 30 thus turning off both lamps 11 and 12.

The lighting system of the present invention has been described herein primarily in terms of its use in recreational vehicles, trailers and the like where a low voltage (12 volts) DC power source is usually available. It is obvious that other DC sources may be employed at other voltage levels and still obtain the improved results thereof. Other modifications and changes can be made without departing from the scope thereof.

What is claimed is:

1. A fluorescent lighting system having a pair of elongated fluorescent lamps comprising:

(a) a first and a second pair of socket connecting means, each pair of which receives opposed matching ends of a pair of fluorescent lamps;

(b) a DC power source;

(c) a power conversion system to convert direct current from the DC power source to alternating or pulsating current of sufficient voltage to cause the illumination of both fluorescent lamps;

(d) a first circuit means to carry in parallel the alternating or pulsting current from the power conversion system to the first pair of socket connecting means;

(e) a second circuit means to connect in series the second pair of socket connecting means to the DC power source; and (f) third circuit means having high capacitance which is electrically coupled to the sockets receiving one of the fluorescent lamps in parallel therewith, the third circuit means having a switch therein to open and close the third circuit means and drawing sufficient current when closed to prevent the illumination of the fluorescent lamp connected parallel therewith.

2. The fluorescent lighting system of claim 1 including a double-pole switching means wherein one pole thereof controls the flow of direct current to the power conversion system and the other pole thereof is part of the switch in the third circuit means.

3. The fluorescent lighting system of claim 1 wherein the power conversion system includes a transformer having a primary winding electrically coupled at one end thereof to the DC power source and on the other end thereof to the collector of a power transistor which causes a current to flow through the primary winding in a periodic manner and thereby induce an alternating or pulsating current in a high voltage secondary winding of the transformer electrically coupled at both ends thereof to the first circuit means.

4. The fluorescent lighting system of claim 3 wherein the transformer includes two secondary heater windings which are adapted to generate low voltage current and each of which is connected in parallel to one of the first pair of socket connecting means.

5. The fluorescent lighting system of claim 3 wherein the power transistor has a feedback circuit from the emitter to the base thereof.

6. The fluorescent lighting system of claim 2 wherein the switching means has three positions, a first position in which the high voltage alternating or pulsating current passes through the first circuit means to both of the first pair of socket connecting means to thereby illuminate both fluorescent lamps, a second position in which the alternating or pulsating current passes through the first circuit means to one of the first pair of socket connecting means and thereby illuminating the fluorescent lamp inserted therein and a substantial portion thereof through the third circuit means parallel with the other fluorescent lamp so that insufficient current passes through the fluorescent lamp to cause the illumination thereof, and a third position which opens a line between the DC power source and the power conversion system to thereby terminate the flow of current throughout the lighting system.

7. The fluorescent lighting system of claim 1 wherein the second circuit means couples the pair of sockets in series to the base of the transistor.

8. The flourescent lighting system of claim 1 wherein the DC source is a low voltage DC source.

9. The flourescent lighting system of claim 7 wherein the second circuit means is a highly resistive circuit.

* * * * *